US010126880B2

(12) United States Patent
Suggs

(10) Patent No.: US 10,126,880 B2
(45) Date of Patent: Nov. 13, 2018

(54) PROJECTIVE COMPUTING SYSTEM

(71) Applicant: Hewlett-Packard Development Company, L.P., Houston, TX (US)

(72) Inventor: Bradley Neal Suggs, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 107 days.

(21) Appl. No.: 14/913,429

(22) PCT Filed: Aug. 22, 2013

(86) PCT No.: PCT/US2013/056099
§ 371 (c)(1),
(2) Date: Feb. 22, 2016

(87) PCT Pub. No.: WO2015/026346
PCT Pub. Date: Feb. 26, 2015

(65) Prior Publication Data
US 2016/0202843 A1 Jul. 14, 2016

(51) Int. Cl.
G06F 3/042 (2006.01)
G06T 11/00 (2006.01)
(Continued)

(52) U.S. Cl.
CPC .......... *G06F 3/0425* (2013.01); *G06F 3/0416* (2013.01); *G06T 7/10* (2017.01);
(Continued)

(58) Field of Classification Search
CPC ..... G06F 3/0425; G06F 3/0416; G06T 7/194; G06T 7/10; G06T 11/001; G09G 3/002
(Continued)

(56) References Cited

U.S. PATENT DOCUMENTS 5,729,251 A 3/1998 Nakashima
7,023,536 B2 4/2006 Zhang et al.
(Continued)

FOREIGN PATENT DOCUMENTS

CN 1231460 A 10/1999
CN 101409826 4/2009
(Continued)

OTHER PUBLICATIONS

Ikinamo ~ "Next Generation UI That Can be Touched With Fingers Against Objects in the Real World"~ YouTube (no copy) ~ https://www.youtube.com ~ Apr. 15, 2013.
(Continued)

*Primary Examiner* — Srilakshmi K Kumar
*Assistant Examiner* — Chineyere Wills-Burns
(74) *Attorney, Agent, or Firm* — HP Inc. Patent Department

(57) ABSTRACT

In one example in accordance with the present disclosure, a method conducted by a projective computing system is provided. The method includes capturing, by a camera of the projective computing system, an image including an object and a background element. The method further includes projecting, by a projector assembly of the projective computing system, an image of the object on top of the object with an artificial shadow adjacent to at least a portion of the image of the object.

15 Claims, 7 Drawing Sheets

(51) Int. Cl.
*G09G 3/00* (2006.01)
*G06F 3/041* (2006.01)
*G06T 7/10* (2017.01)
*G06T 7/194* (2017.01)

(52) U.S. Cl.
CPC ............ *G06T 7/194* (2017.01); *G06T 11/001* (2013.01); *G09G 3/002* (2013.01)

(58) Field of Classification Search
USPC ........................................................ 345/175
See application file for complete search history.

(56) References Cited

U.S. PATENT DOCUMENTS

| | | | |
|---|---|---|---|
| 7,038,846 | B2 | 5/2006 | Mandella et al. |
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,474,809 | B2 | 1/2009 | Carl et al. |
| 7,599,561 | B2 | 10/2009 | Wilson et al. |
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 8,121,640 | B2 | 2/2012 | Russ et al. |
| 8,199,117 | B2 | 6/2012 | Izadi et al. |
| 8,328,653 | B2 | 12/2012 | Lock |
| 8,736,583 | B2 | 5/2014 | Anderson et al. |
| D726,184 | S * | 4/2015 | Burton .......................... D14/388 |
| 2004/0046736 | A1 | 3/2004 | Pryor et al. |
| 2005/0078092 | A1 | 4/2005 | Clapper |
| 2005/0078879 | A1* | 4/2005 | Sakurai ................. G06T 3/0006 382/275 |
| 2005/0168437 | A1 | 8/2005 | Carl et al. |
| 2005/0168448 | A1 | 8/2005 | Simpson |
| 2007/0035655 | A1* | 2/2007 | Chen ....................... H04N 1/04 348/373 |
| 2007/0061365 | A1 | 3/2007 | Giegerich et al. |
| 2007/0110309 | A1 | 5/2007 | Ibrahim et al. |
| 2008/0018591 | A1 | 1/2008 | Pittel et al. |
| 2008/0295035 | A1 | 11/2008 | Mattila et al. |
| 2009/0096909 | A1* | 4/2009 | Yamashita ............. H04N 7/181 348/333.01 |
| 2010/0207911 | A1 | 8/2010 | Newton |
| 2010/0315413 | A1* | 12/2010 | Izadi ........................ G06F 3/017 345/419 |
| 2011/0227915 | A1 | 9/2011 | Mandella et al. |
| 2011/0242054 | A1 | 10/2011 | Tsu |
| 2012/0004288 | A1 | 1/2012 | Worm |
| 2012/0038549 | A1 | 2/2012 | Mandella et al. |
| 2012/0042288 | A1 | 2/2012 | Liao et al. |
| 2012/0062518 | A1 | 3/2012 | Cable |
| 2012/0249422 | A1* | 10/2012 | Tse .......................... G06F 3/017 345/158 |
| 2012/0326958 | A1* | 12/2012 | Deuel .................... G06F 3/0421 345/156 |
| 2013/0009869 | A1* | 1/2013 | Wilensky ............ G06F 3/04845 345/156 |
| 2013/0077236 | A1 | 3/2013 | Becze et al. |
| 2013/0088461 | A1 | 4/2013 | Shamaie |
| 2013/0113920 | A1 | 5/2013 | Blanton et al. |
| 2013/0194418 | A1 | 8/2013 | Gonzalez-Banos et al. |
| 2014/0139717 | A1* | 5/2014 | Short ...................... H04N 7/142 348/333.1 |
| 2015/0227795 | A1* | 8/2015 | Starner .............. G06K 9/00671 345/156 |

FOREIGN PATENT DOCUMENTS

| | | |
|---|---|---|
| EP | 0622722 A2 | 4/1994 |
| EP | 0622722 A3 | 4/1999 |
| JP | 2003-270719 | 9/2003 |
| JP | 2013-118596 | 6/2013 |
| KR | 2010-0090755 | 8/2010 |
| KR | 2013-0075344 | 7/2013 |
| WO | WO-2012/172363 | 12/2012 |
| WO | WO-2012172363 A2 | 12/2012 |
| WO | WO2013/019217 | 2/2013 |
| WO | WO-2013019190 | 2/2013 |
| WO | WO-2013019252 | 2/2013 |

OTHER PUBLICATIONS

Newman et al ~ "A Desk Supporting Computer-Based Interaction with Paper Documents"~ ACM 1992 ~ May 3, 2992 ~ 6 pages.
Bernard Frischer and Anastasia Dakouri-Hild, "Beyond Illustration: 2D and 3D Digital Technologies as Tools for Discovery in Archaeology," Feb. 21, 2008, pp. 1-181.
Gao, Rui et al; Microsoft Research-Mobile Surface: Microsoft Research; 2010; http://research.microsoft.com/en-us/projects/mobilesurface/ ~ 1 page.
Hand, Randall; Infinite Z Launches zSpace Virtual Holographic 3D Display for Designers; VizWorld.com; Dec. 13, 2011 ~ 2 pags.
Harrison, Beverly & Ziola, Ryder; Bringing Toys to Life: Intel Labs OASIS Project; Augmented Engineering; Jan. 26, 2011; 1 page.
Harrison, Chris et al; OmniTouch: Wearable Multitouch Interaction Everywhere; UIST'11, Oct. 16, 2011; 10 pages.
Hartmann, Bjorn et al; Pictionaire: Supporting Collaborative Design Work by Integrating Physical and Digital Artifacts; CSCW 2010; Feb. 6, 2010; 4 pages.
Hinckley, Ken et al; Pen + Touch = New Tools; UIST'10; Oct. 3, 2010; 10 pages.
Izadi, Shahram et al; C-Slate: A Multi-Touch and Object Recognition System for Remote Collaboration Using Horizontal Surfaces; IEEE; 2007; 8 pages.
Junuzovic, Sasa et al; Microsoft Research—IllumiShare; Microsoft Research, 2012; http://delivery.acm.org ~ 2 pages.
Kane, Shaun K. et al; Bonfire: A Nomadic System for Hybrid Laptop-Tabletop Interaction; UIST'09; Oct. 4, 2009; 10 pages.
Linder, Natan et al; LuminAR: Portable Robotic Augmented Reality Interface Design and Prototype; UIST'10, Oct. 3, 2010; 2 pages.
Melanson, Donald; Microsoft Research Working on Portable Surface; Mar. 2, 2010; http://www.engadget.com ~ 2 pages.
Melanson, Donald; Wiimote Repurposed for Multi-Point Interactive Whiteboard; Dec. 10, 2007; http://www.engadget.com ~ 2 pages.
PCT Search Report/Written Opinion ~ Application No. PCT/US2013/056099 dated May 30, 2014 ~ 11 pages.
Simonite, Tom; A Kitchen Countertop With a Brain; MIT Technology Review; Jul. 2, 2010; http://www.technologyreview.com ~ 2 pages.
Wilson, Andrew D. et al; Combining Multiple Depth Cameras and Projectors for Interactions On, Above, and Between Surfaces; UIST'10; Oct. 3, 2010; 10 pages.
Wilson, Andrew D.; Using a Depth Camera as a Touch Sensor; ITS 2010: Devices & Algorithms; Nov. 7, 2010; 4 pages.

* cited by examiner

PROJECTIVE COMPUTING SYSTEM

BACKGROUND

Computer systems typically employ a display or multiple displays which are mounted on a support stand and/or are incorporated into some other component of the computer system. For displays employing touch sensitive technology (e.g., touch screens), it is often desirable for a user to interact directly with such displays in order to fully utilize such touch technology during system operations. However, optimum ergonomic placement of a display for simply viewing an image thereon is often at odds with such placement for engaging in touch interaction therewith. Thus, users desiring to use a single computer system for both traditional viewing applications as well as touch interactive application often encounter difficulties in positioning and/or utilizing such systems.

BRIEF DESCRIPTION OF THE DRAWINGS

For a detailed description of various examples, reference will now be made to the accompanying drawings in which.

NOTATION AND NOMENCLATURE

Figure 1:
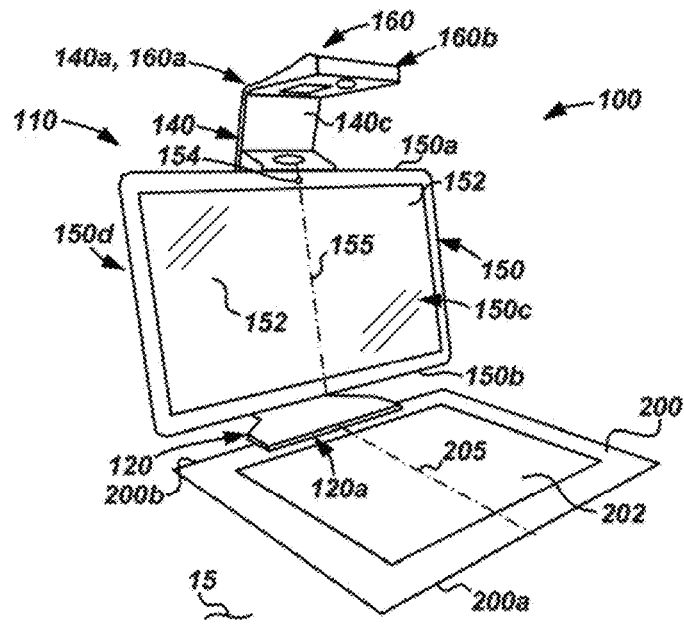
FIG. 1 is a schematic perspective view of an example of a projective computer system in accordance with the principles disclosed herein.
Figure 2:
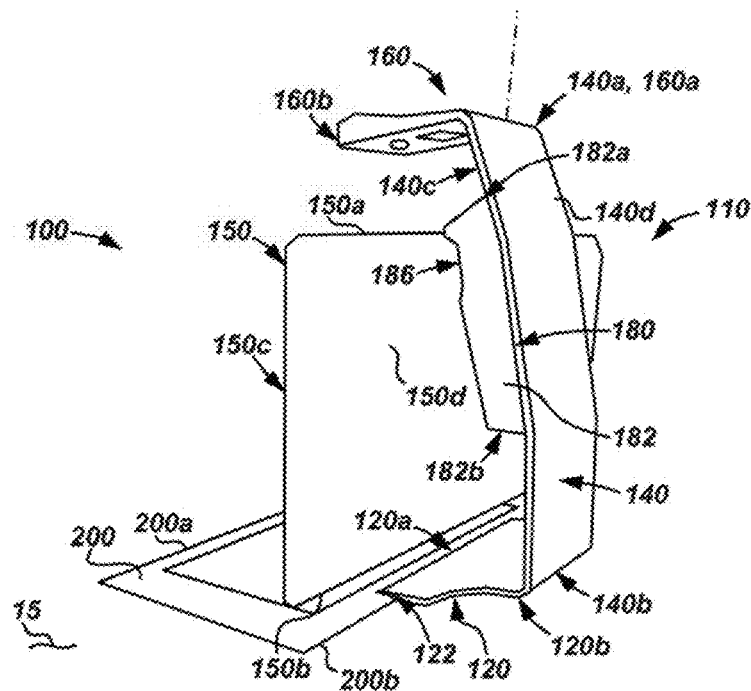
FIG. 2 is another schematic perspective view of the computer system of FIG. 1 in accordance with the principles disclosed herein.

Certain terms is are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. In addition, as used herein, the phrase "user input device" refers to any suitable device for providing an input, by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure including the claims, is limited to that example.

Referring now to FIGS. 1-4, a projective computing system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4 support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 1602 of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 3:
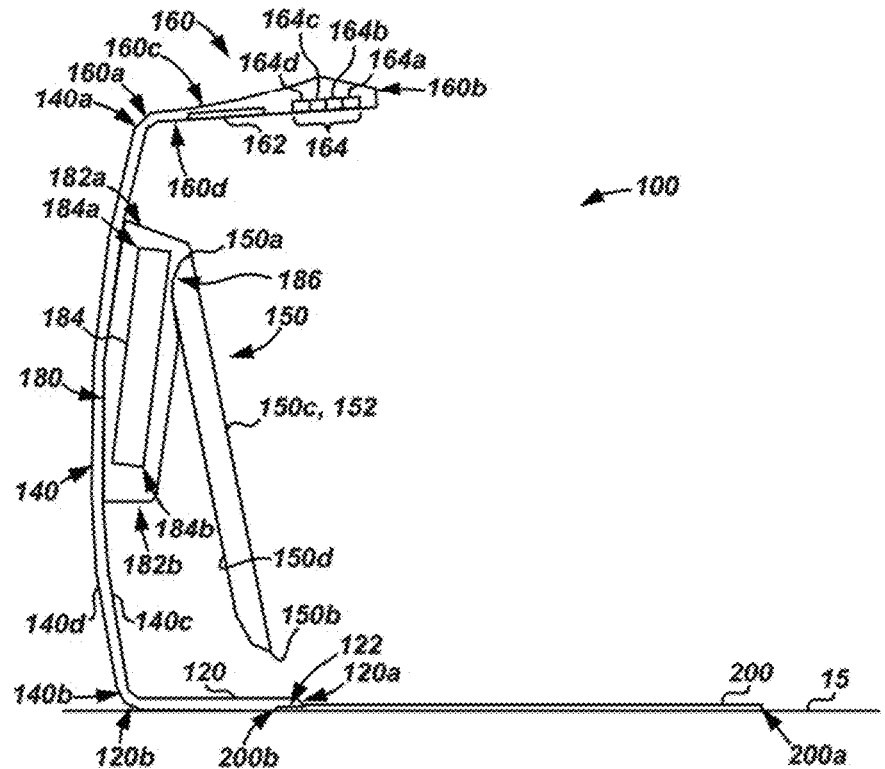
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
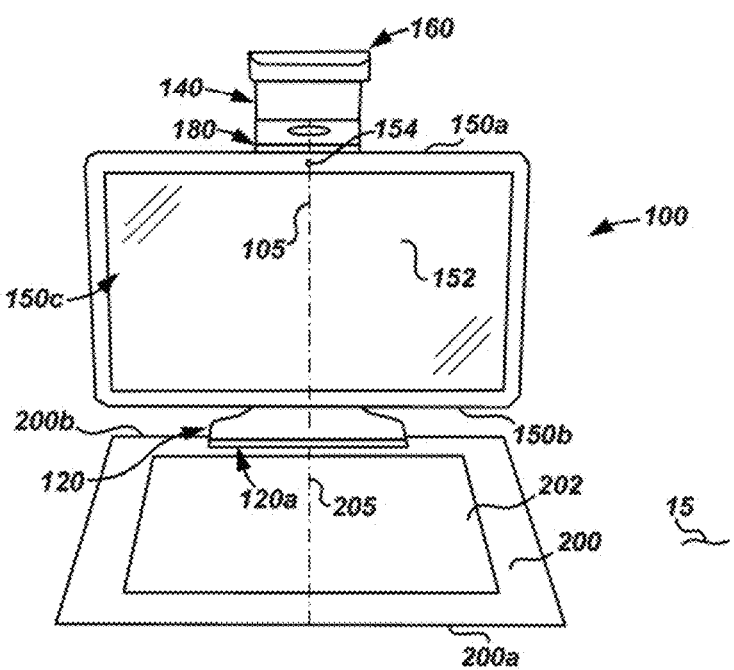
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200, in other examples, mirror 162 could have, a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a visual RGB 14.1 megapixel high resolution camera) 164b, a depth sensor or camera 164c, and a three dimensional (3D) user interface sensor 164d. Ambient light sensor 164a is arranged to measure the intensity of light of the environment surrounding system 100, in order to in some implementations, adjust the camera's and/or sensors (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object 40 (e.g., a document, photo, book, 2D object, and/or 3D object) disposed on mat 200. For example, the camera 164b may be a visual 14.1 megapixel RBG camera. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensors field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the matt 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
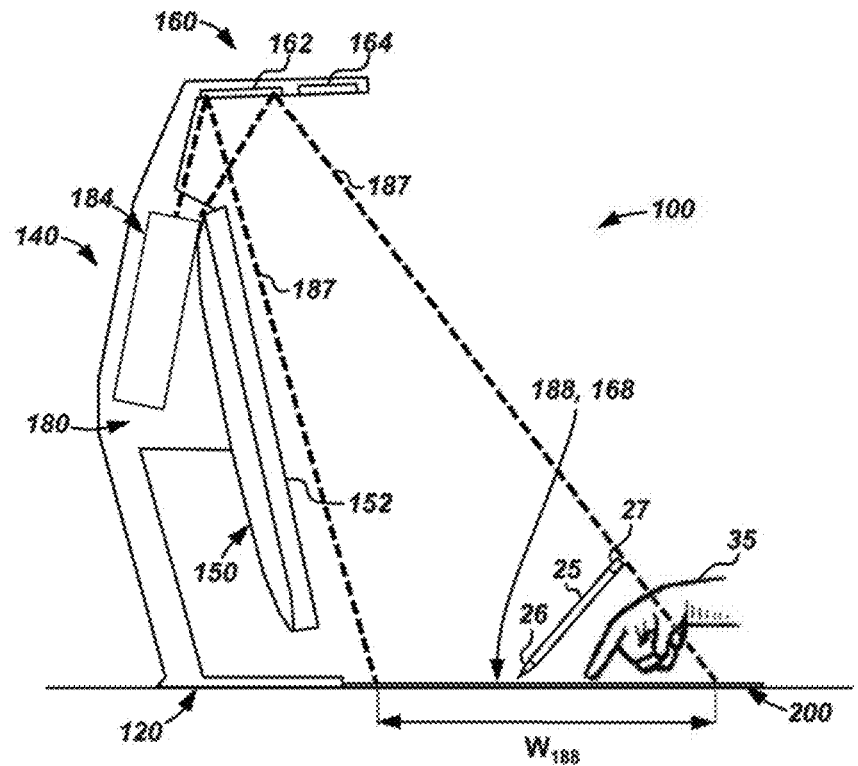
FIG. 5 is a schematic side view of the computer system of FIG. 1 during operation in accordance with the principles disclosed herein.
Figure 6:
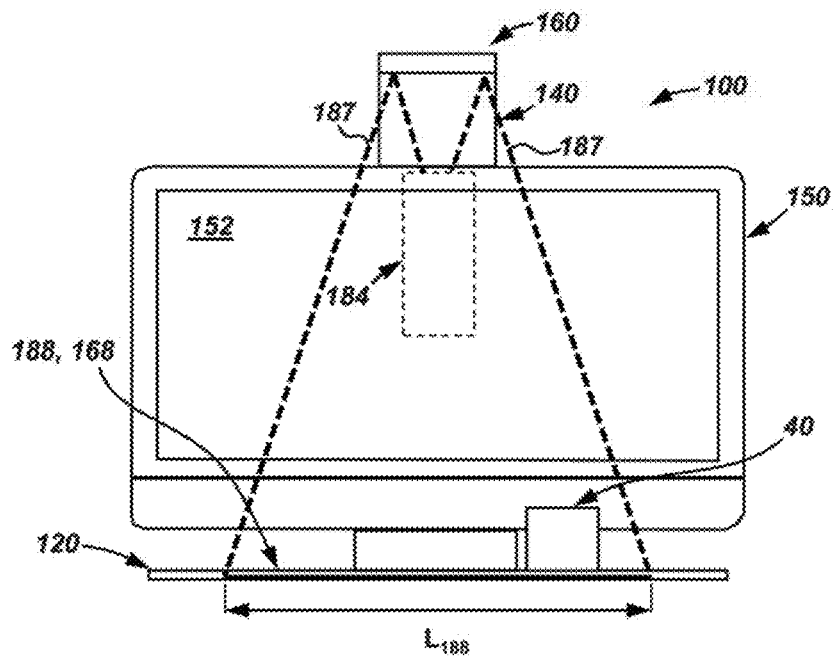
FIG. 6 is a schematic front view of the system of FIG. 1 during operation in accordance with the principles disclosed herein.

Referring now to FIGS. 5 and 6, during operation of system 100, light 187 is emitted from projector assembly 184 and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described. In some examples, both space 188 and space 168 coincide or correspond with surface 202 of mat 200, previously described, to effectively integrate the functionality of the touch sensitive surface 202, projector assembly 184, and sensor bundle 164 within a defined area.

Figure 7:
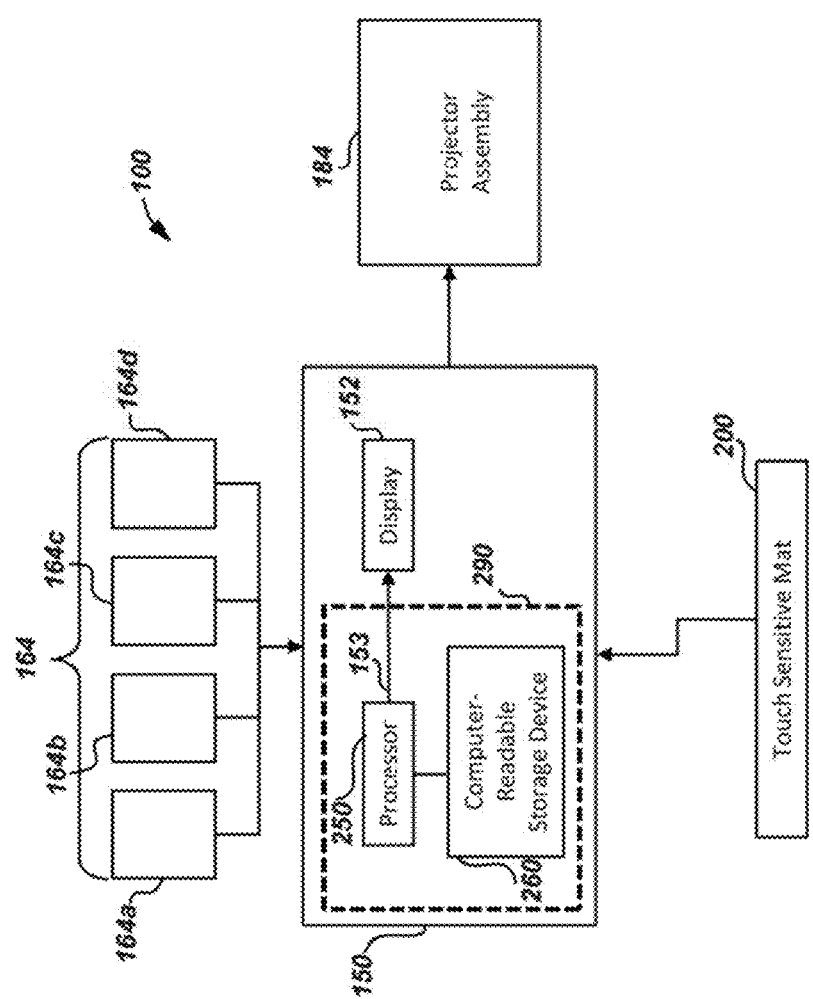
FIG. 7 is a black box circuit diagram of the computer system of FIG. 1 in accordance with the principles disclosed herein.

Referring now to FIGS. 5-7, in some examples, device 150 directs assembly 184 to project an image onto surface 202 of mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as direct interaction with a user's hand 35, through a stylus 25, or other suitable user input device(s).

As best shown in FIG. 7, when a user interacts with surface 202 of mat 200, a signal is generated which is routed to device 150 through any of the electrical coupling methods and devices previously described. Once device 150 receives the signal generated within mat 200, it is routed, through internal conductor paths 153, to a processor 250 which communicates with a non-transitory computer-readable storage device 260 to generate an output signal which is then routed back to projector assembly 184 and/or display 152 to implement a change in the image projected onto surface 202 and/or the image displayed on display 152, respectively. It should also be appreciated that the processor 250 may be at least one of a central processing unit (CPU), a semiconductor-based microprocessor, a graphics processing unit (GPU), a microcontroller, or another processing device configured to fetch, decode, and/or and execute instructions retrieved from the non-transitory computer-readable storage device 260. It should also be appreciated that the non-transitory computer-readable storage device 260 may correspond to any typical storage device that stores machine-readable instructions, such as programming code, software, firmware, or the like. For example, the non-transitory computer-readable storage device 260 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that can be executed by the processor 250. In this case, the non-transitory computer-readable storage device 260 may be a portable medium such as a CD, DVD, or flash drive or a memory maintained by a server from which the installation package can be downloaded and installed. In another implementation, the instructions may be part of an application or application already installed. Here, the non-transitory computer-readable storage device 260 may include integrated memory such as a hard drive. Furthermore, in some examples, the processor 250 is integrated with the computer readable storage device 260, while in other examples, the processor 250 and the computer readable storage device 260 are discrete components.

Referring again to FIGS. 5-7, during operation of at least some examples, system 100 may capture a two dimensional (2D) image of a 2D or 3D physical object (e.g., a document, picture, book etc) 40 located on the touch sensitive mat 200. The captured image may then be processed and the resulting image may be projected onto the touch sensitive mat 200 and/or onto the physical object 40 itself for further use and manipulation thereof. More specifically, in some examples, an object 40 (e.g., a document or picture) may be placed on surface 202 such that a sensor (e.g., camera 164b) may capture an image of the object 40 and/or a background element (e.g., a portion of the touch sensitive mat 200). The image may then be routed to the image processing module 290 comprising processor 250 and computer readable storage device 260 for processing. The image processing module 290 may process the received image to remove the background element such that only an image of the object 40 remains. The resulting image may then be projected by the projector assembly 184 on the touch sensitive mat 200 and/or directly onto the object 40 itself.

It should be understood that while FIG. 7 depicts the image processing module 290 as comprising only processor 250 and computer readable storage device 260, in various examples, the image processing module 290 comprises additional or alternative components. For example, the image processing module 290 may comprise a functionally equivalent circuit like an analog circuit, a digital signal processing device circuit, an application specific integrated circuit (ASIC), or other logic devices arranged to perform the same function as the processor 250 and computer readable storage device 260.

Figure 8B:
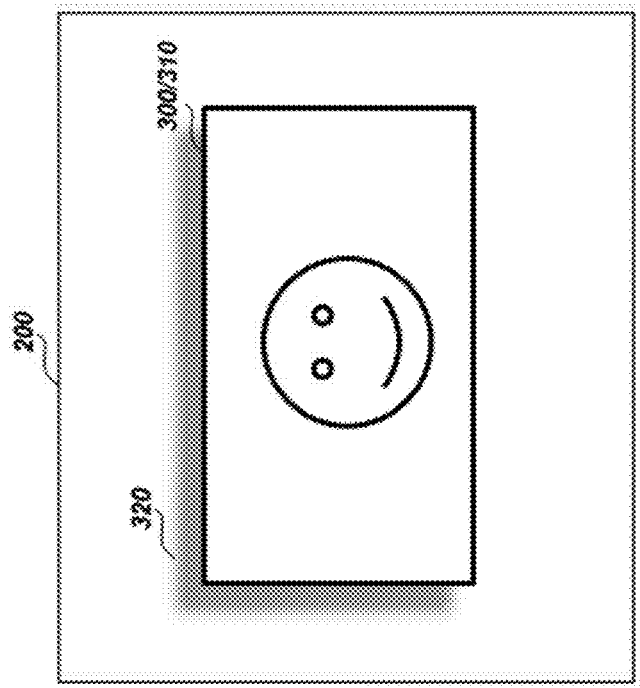
FIG. 8(B) is a schematic view of the photo on the touch mat of the computer system of FIG. 1 after capture and projection in accordance with the principles disclosed herein.
Figure 8A:
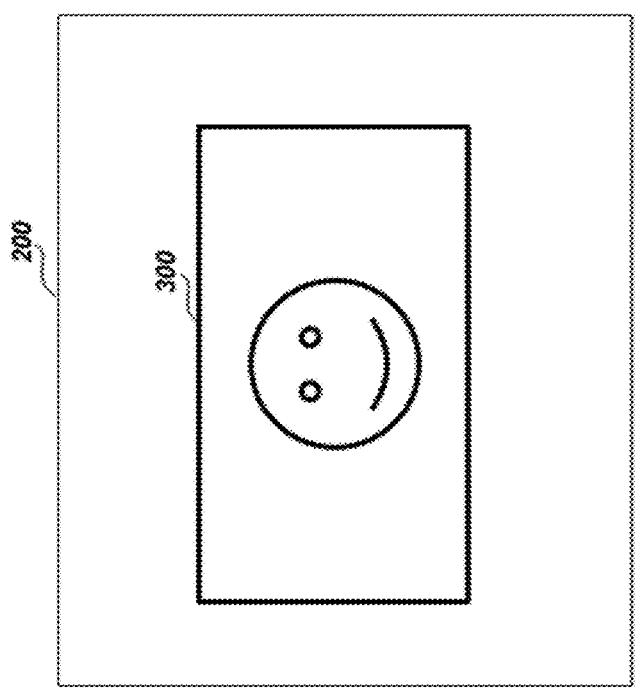
FIG. 8(A) is a schematic view of a photo on a touch mat of the computer system of FIG. 1 prior to capture and projection.

Turning now to FIGS. 8(A) and 8(B), as mentioned, the system 100 may capture an image of an object 40, process the image, and project the resulting image directly onto the object 40. Because the projected image may be the same scale and/or color as the object 40, it may be difficult for a user to determine when the resulting image is being projected. Put another way, the projected image may appear the same as the object itself, and therefore it may be difficult for a user to determine when the image is being projected because the image is projected directly onto the object. Among other things, this may cause the user to unnecessarily trigger the capture and project functions again.

In order to overcome this problem and to provide the user with a clear indication that the image capture and subsequent image projection functions are complete, various examples generate an artificial shadow around the projected image. For example, FIG. 8(A) depicts a photo 300 sitting on the touch sensitive mat 200 prior to image capture. FIG. 8(B) depicts to same scene after the photo 300 is captured by a sensor (e.g., camera 164b) and an image of the photo 310 is projected onto the photo 300. More specifically, in FIG. 8(B), the image of the photo 310 is essentially the same as the photo 300 in terms of at least scale and color, and therefore it is difficult to determine when the image of the photo 310 is being projected. In order to help a user discern that the image of the photo 310 is being projected, an artificial shadow 320 is projected with the image of the photo 310. The artificial shadow informs the user that the image of the photo 310 is currently being projected, and further provides the appearance that the photo 300 is lifting off the touch sensitive mat 200. Hence, a user can quickly determine that the capture and project functions are complete without having to conduct additional tasks such as moving the object.

In some examples, after capturing the image and prior to projecting, the image processing module 290 conducts processing to remove background elements such that only an image of the object remains. For example, referring to FIGS. 8(A) and 8(B), when the sensor (e.g., camera 164b) captures the image of the photo 300, a portion of the touch sensitive mat 200 may also be captured. The image processing module 290 may therefore process the captured image to separate the photo 300 from the touch sensitive mat 200 such that only an image of the photo 300 is projected and not an image of the touch sensitive mat 200. In addition to segmentation processing to remove background elements, the image processing module 290 may also conduct processing to remove shadows from the scan illumination to properly segment the image.

Figure 9:
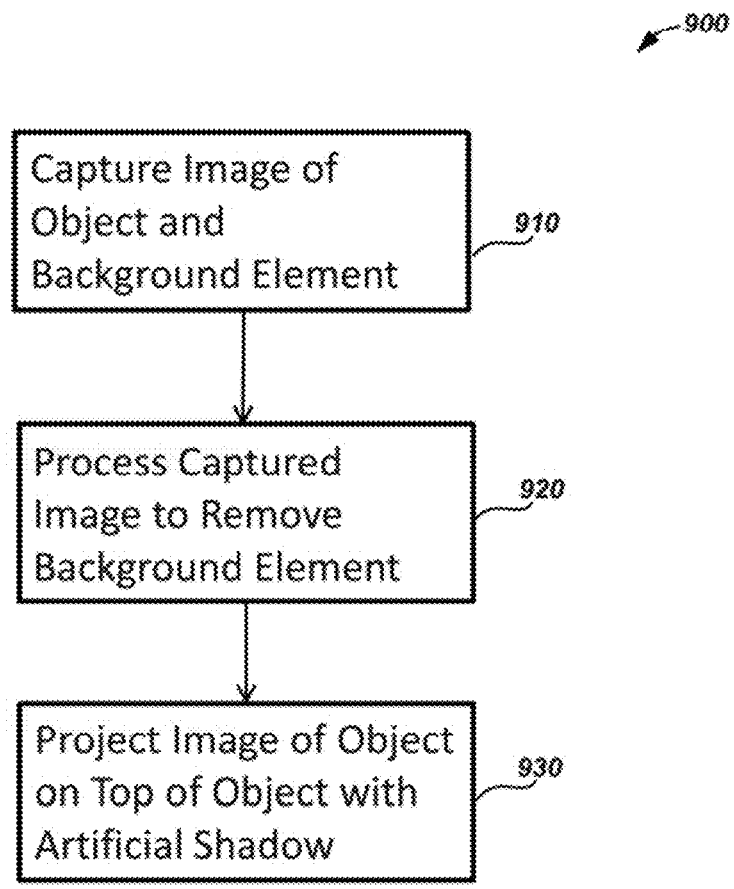
FIG. 9 is a process flow diagram of processes conducted by the computing system of FIG. 1 in accordance with the principles disclosed herein.

FIG. 9 depicts an example process flow diagram 900 for processes conducted by system 100 in accordance with an example. It should be readily apparent that the processes depicted in FIG. 9 represents generalized illustrations, and that other processes may be added or existing processes may be removed, modified, or rearranged without departing from the scope and spirit of the present disclosure. Further, it should be understood that the processes may represent executable instructions stored on memory that may cause the system 100 to respond, to perform actions, to change states, and/or to make decisions. Thus, the described processes may be implemented as executable instructions and/or operations provided by a memory associated with the system 100. Alternatively or in addition, the processes may represent functions and/or actions performed by functionally equivalent circuits like an analog circuit, a digital signal processing device circuit, an application specific integrated circuit (ASIC), or other logic devices associated with the system 100. Furthermore, FIG. 9 is not intended to limit the implementation of the described implementations, but rather the figure illustrates functional information one skilled in the art could use to design/fabricate circuits, generate software, or use a combination of hardware and software to perform the illustrated.

The process 900 may begin at block 910, where a camera of the system 100 captures and image comprising at least a portion of the touch sensitive mat 200 and an object 40 located on the touch sensitive mat 200. At block 920, after capturing the image, the image processing module 290 processes the captured image comprising the object and the background element to remove the background element. Thus, only an image of the object remains. Thereafter, at block 930, the projector assembly projects the image of the object on top of the object with an artificial shadow adjacent to at least a portion of the image of the object (see, e.g., FIG. 8(B)). As mentioned above, the artificial shadow informs the user that the capture and project functions of the projective computing system 100 are complete.

Depending on the implementation, the artificial shadow may be projected in various ways. For example, the artificial shadow may be configured to be displayed in different colors (e.g., light gray, dark gray, etc.), different transparency levels (e.g., 50% transparency), different sizes (e.g., 5 mm from object 1 mm from object, etc.), and/or different angles (e.g., 0°-360° from center of object). Additionally, in some examples, the dimensions of the artificial shadow are based at least in part on the dimensions of the object (e.g., larger object=larger shadow; smaller object=smaller shadow). Still further, in some examples, a directional light parameter may be set by the user such that the shadow appears based on the directional light parameter setting. For example, the directional light parameter may be set to "southeast," and therefore the shadow would appear adjacent to the object based on the light source being located southeast of the object. In some examples, the directional light parameter may have a default setting for all artificial shadows, while in other examples the directional light parameter setting may be user configurable.

Figure 11:
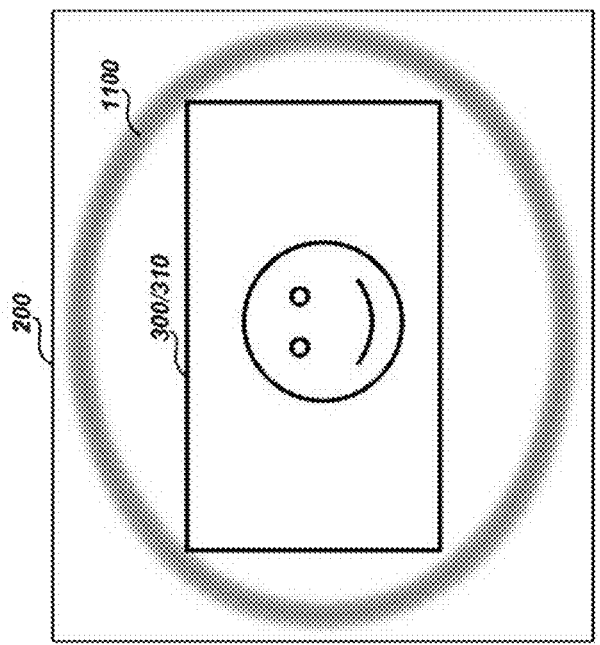
FIG. 11 is yet another schematic view of the photo on the touch mat of the computer system of FIG. 1 after capture and projection in accordance with the principles disclosed herein.
Figure 10:
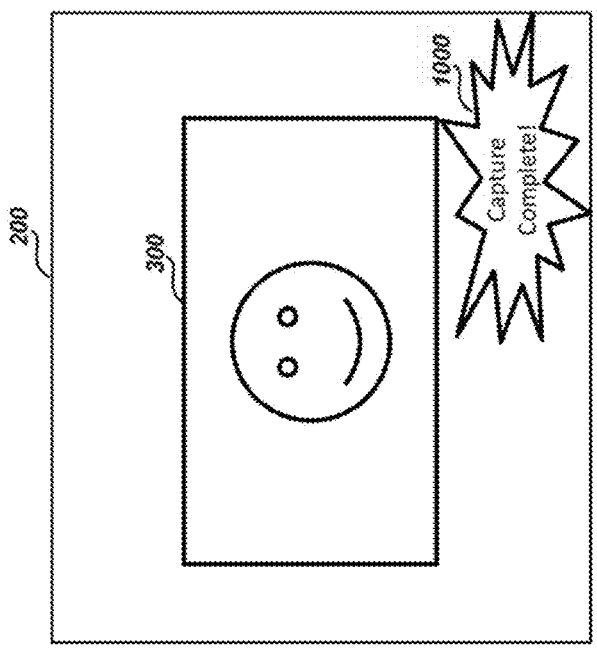
FIG. 10 is another schematic view of the photo on the touch mat of the computer system of FIG. 1 after capture and projection in accordance with the principles disclosed herein.

Turning now to FIGS. 10 and 11 while the above description has focused on an artificial shadow, it should be understood that other images may be projected with the image of the object to inform the user that the capture and project functions are complete. For instance, an artificial image of a star may be projected, as shown in FIG. 10. Alternatively, an artificial image of a halo may be projected, as shown in FIG. 11. These artificial images may include text, such as "capture complete" like shown in FIG. 10. Moreover, the artificial image may be of only text and not include a symbol, halo, and/or shadow. Furthermore, in addition to projecting an image to signify completion of the projection, a sound may also be played. For example, a short "ding" or "click" sound may be played prior to, concurrently, or after the image is projected. This sound may provide an additional indication that the projection function is complete in addition to the above-described shadow, halo, and/or symbol.

In the manner described, through use of examples of the projective computer system 100 in accordance with the principles disclosed herein, an image of a physical object may be captured, processed, and projected directly onto the object. In order to make the projected image more apparent, an artificial image such as a shadow may be included with the projected image and adjacent to the object image. More specifically, after an image capture by the camera, the object may be separated from the background and additional processing may remove shadows from the scan illumination to properly segment the object. Thereafter, the image of the object may be projected with the artificially generated shadow. In examples, the shadow is not be part of the captured image, but rather displayed to indicate the completion of capture and segmentation. The shadow may be provided as if a directional light was at a particular location and the objects hovering over or sinking into the mat. In addition, the apparent light casting the shadows may be more focused or more diffused to create a sharper or softer shadow. Furthermore, information from the 3D sensor with regard to actual object height may be used to make shadows longer or shorter thereby corresponding to the actual object height.

While device 150 has been described as an all-in-one computer, it should be appreciated that in other examples, device 150 may further employ the use of more traditional user input devices such as, for example, a keyboard and a mouse. In addition, while sensors 164*a*, 164*b*, 164*c*, 164*d* within bundle 164 have been described as each representing a single sensor or camera, it should be appreciated that each of the sensors 164*a*, 164*b*, 164*c*, 164*d* may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A projective computing system, comprising:
   a base with a raised portion to provide a void formed between the base and a support surface to receive a touch sensitive mat within the void, wherein the touch sensitive mat contacts the raised portion of the base when received inside the void;
   an upright member formed to and extending upward from the base;
   a camera located above the touch sensitive mat, wherein the camera is to capture an image comprising at least a portion of the touch sensitive mat and an object in contact with the touch sensitive mat;
   an image-processor to generate an image of the object based on the captured image; and
   a projector assembly to project the image of the object with an artificial shadow adjacent to at least a portion of the image of the object, wherein the artificial shadow is a visual indicator that the image capture and image projection is complete.

2. The projective computing system of claim 1, wherein the projector assembly projects the image of the object on top of the object located on the touch sensitive mat.

3. The projective computing system of claim 1, wherein the image of the object is a two-dimensional image.

4. The projective computing system of claim 1, wherein the dimensions of the artificial shadow are based at least in part on the dimensions of the object or the dimensions of the image of the object.

5. The projective computing system of claim 1, wherein the image of the object is the same scale as the object.

6. The projective computing system of claim 1, wherein the image processor processes the image to remove portions of the touch sensitive mat.

7. The projective computing system of claim 1, wherein the object comprises at least one of a picture and a document.

8. The projective computing system of claim 1, wherein the projector assembly projects the image of the artificial shadow based at least in part on a directional light parameter.

9. A method conducted by a projective computing system, comprising:
capturing, by a camera located within a cantilevered top extending outward from an upright member which is formed to and extends upward from a base, an image comprising an object in contact with a touch sensitive mat and a background element, wherein the base comprises a raised portion to provide a void formed between the base and a support surface to receive the touch sensitive mat within the void, wherein the touch sensitive mat contacts the raised portion of the base when received inside the void; and
projecting, by a projector assembly of the projective computing system, an image of the object on top of the object with an artificial shadow adjacent to at least a portion of the image of the object, wherein the artificial shadow is a visual indicator that the image capturing, and image projecting is complete.

10. The method of claim 9, further comprising:
processing the image comprising the object and the background element to remove the background element.

11. The method of claim 9, further comprising:
obtaining a directional light parameter; and
projecting the artificial shadow based at least in part on the directional light parameter.

12. The method of claim 9, wherein the image of the object is the same scale as the object.

13. A projective computing system, comprising:
a support structure including a base with a raised portion to provide a void formed between the base and a support surface to receive a touch sensitive mat within the void, wherein the touch sensitive mat contacts the raised portion of the base when received inside the void, an upright member formed to and extending upward from the base, and a cantilevered top extending outward from the upright member;
a camera located within the cantilevered top, wherein the camera is to capture an image of an object in contact with the touch sensitive mat; and
a projector assembly to project the image of the object on top of the object with an artificial image adjacent to at least a portion of the image of the object, wherein the artificial shadow is a visual indicator that the image capture and image projection is complete.

14. The projective computing system of claim 13, wherein the artificial image comprises at least one of a shadow, a halo, and a symbol.

15. The projective computing system of claim 13, wherein the object comprises at least one of a picture and a document.

* * * * *